US011868218B1

(12) United States Patent
Goren et al.

(10) Patent No.: US 11,868,218 B1
(45) Date of Patent: Jan. 9, 2024

(54) RECOVERY POINT OBJECTIVE COMPLIANT STAR REPLICATION

(71) Applicant: VAST DATA LTD., Tel Aviv (IL)

(72) Inventors: Avi Goren, Tel Aviv (IL); Ohad Ben-Yehuda, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/938,863

(22) Filed: Oct. 7, 2022

(51) Int. Cl.
*G06F 11/16* (2006.01)
*G06F 11/20* (2006.01)

(52) U.S. Cl.
CPC ...... *G06F 11/1662* (2013.01); *G06F 11/2023* (2013.01); *G06F 11/2046* (2013.01); *G06F 2201/84* (2013.01)

(58) Field of Classification Search
CPC ............. G06F 11/1662; G06F 11/2023; G06F 11/2046; G06F 2201/84
See application file for complete search history.

(56) References Cited

U.S. PATENT DOCUMENTS

| | | | | |
|---|---|---|---|---|
| 8,150,805 B1* | 4/2012 | Tawri | ................ | G06F 21/6218 |
| | | | | 707/610 |
| 8,332,354 B1* | 12/2012 | Chatterjee | ........... | G06F 11/1461 |
| | | | | 707/E17.007 |
| 8,401,997 B1* | 3/2013 | Tawri | ................ | G06F 11/2071 |
| | | | | 707/655 |
| 10,459,806 B1* | 10/2019 | He | ......................... | G06F 3/065 |
| 11,748,376 B1* | 9/2023 | Wang | ................... | G06F 16/273 |
| | | | | 707/613 |
| 2009/0171704 A1* | 7/2009 | Bobak | ................. | G06Q 10/103 |
| | | | | 705/1.1 |
| 2015/0067231 A1* | 3/2015 | Sundarrajan | ........ | G06F 11/1451 |
| | | | | 711/103 |
| 2016/0026535 A1* | 1/2016 | Bhat | ................... | G06F 11/2048 |
| | | | | 714/19 |
| 2017/0075605 A1* | 3/2017 | Sundarrajan | ........ | G06F 11/1451 |
| 2018/0024894 A1* | 1/2018 | Naik | ..................... | G06F 3/0605 |
| | | | | 711/162 |

(Continued)

OTHER PUBLICATIONS

A. K. Pandey, A. Kumar, N. Malviya and B. Rajendran, "A Survey of Storage Remote Replication Software," 2014 3rd International Conference on Eco-friendly Computing and Communication Systems, Mangalore, India, 2014, pp. 45-50 (Year: 2014).*

*Primary Examiner* — Matthew M Kim
*Assistant Examiner* — Indranil Chowdhury
(74) *Attorney, Agent, or Firm* — Reches Patents

(57) ABSTRACT

A method for recovery point objective compliant star replication, the method includes: obtaining, by a SSS, a user defined RPO value; performing replication iterations to each DSS according to replication schedules of the DSSs, wherein at least two DSSs of the multiple DSSs are assigned with replication schedules having different frequencies of replication iterations; wherein each replication iteration includes sending a content related to a scheduled snapshot; determining a conformance to the RPO, of a time elapsed since a content related to a last common snapshot was replicated to each one of the multiple DSSs; and performing a non-scheduled common (NSC) replication iteration to each of the multiple DSSs to prevent a violation of the RPO, wherein the NSC replication iteration includes sending content related to a NSC snapshot to each one of the multiple DSSs.

21 Claims, 4 Drawing Sheets

(56) References Cited

U.S. PATENT DOCUMENTS

| | | | | |
|---|---|---|---|---|
| 2019/0163370 A1* | 5/2019 | Sure | .................... | G06F 11/0793 |
| 2019/0391878 A1* | 12/2019 | Mark | ................... | G06F 11/1458 |
| 2020/0057697 A1* | 2/2020 | Yeung | ................. | G06F 11/1466 |
| 2020/0183794 A1* | 6/2020 | Dwarampudi | ....... | G06F 11/3409 |
| 2020/0293193 A1* | 9/2020 | Littlefield | ............. | G06F 3/0641 |
| 2021/0073097 A1* | 3/2021 | Upadhyay | ............ | G06F 11/0757 |
| 2021/0232465 A1* | 7/2021 | Neier | ................... | G06F 11/1461 |
| 2021/0279229 A1* | 9/2021 | Parasnis | ................... | G06F 16/27 |
| 2022/0091943 A1* | 3/2022 | Rao | ...................... | G06F 16/2358 |
| 2022/0092024 A1* | 3/2022 | Kavaipatti Anantharamakrishnan | .................. | G06F 16/125 |
| 2022/0129353 A1* | 4/2022 | Bhagi | ................. | G06F 11/2094 |
| 2022/0156162 A1* | 5/2022 | Reyes | ................. | G06F 11/3006 |
| 2022/0229805 A1* | 7/2022 | Chakeres | ................ | G06F 16/27 |
| 2022/0318264 A1* | 10/2022 | Jain | ..................... | G06F 11/2094 |
| 2022/0374316 A1* | 11/2022 | Kumar | ................ | G06F 16/1824 |
| 2022/0398163 A1* | 12/2022 | Bezbaruah | .......... | G06F 11/2097 |
| 2023/0082186 A1* | 3/2023 | Balcha | ................ | G06F 11/1451 714/4.11 |
| 2023/0109510 A1* | 4/2023 | Polimera | ............. | G06F 11/1435 714/6.3 |
| 2023/0214302 A1* | 7/2023 | Srivastava | .............. | G06F 12/14 714/6.3 |

* cited by examiner

RECOVERY POINT OBJECTIVE COMPLIANT STAR REPLICATION

TECHNICAL FIELD

The present disclosure generally relates to the field of data storage, and more particularly to star replication.

BACKGROUND

Replications are aimed to protect content stored in a storage system in case of a storage system failure. Typically, scheduled replication iterations are scheduled.

A RPO (recovery point objective) may be defined for a replication, which is the maximum allowed gap, between the time when the most recent data was written to the source system and the time of the data that the failed over replication starts to replicate from.

There is a growing need to provide a replication process that is RPO compliant.

SUMMARY

There may be provide a storage system, a method and a non-transitory computer readable medium for recovery point objective compliant star replication.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
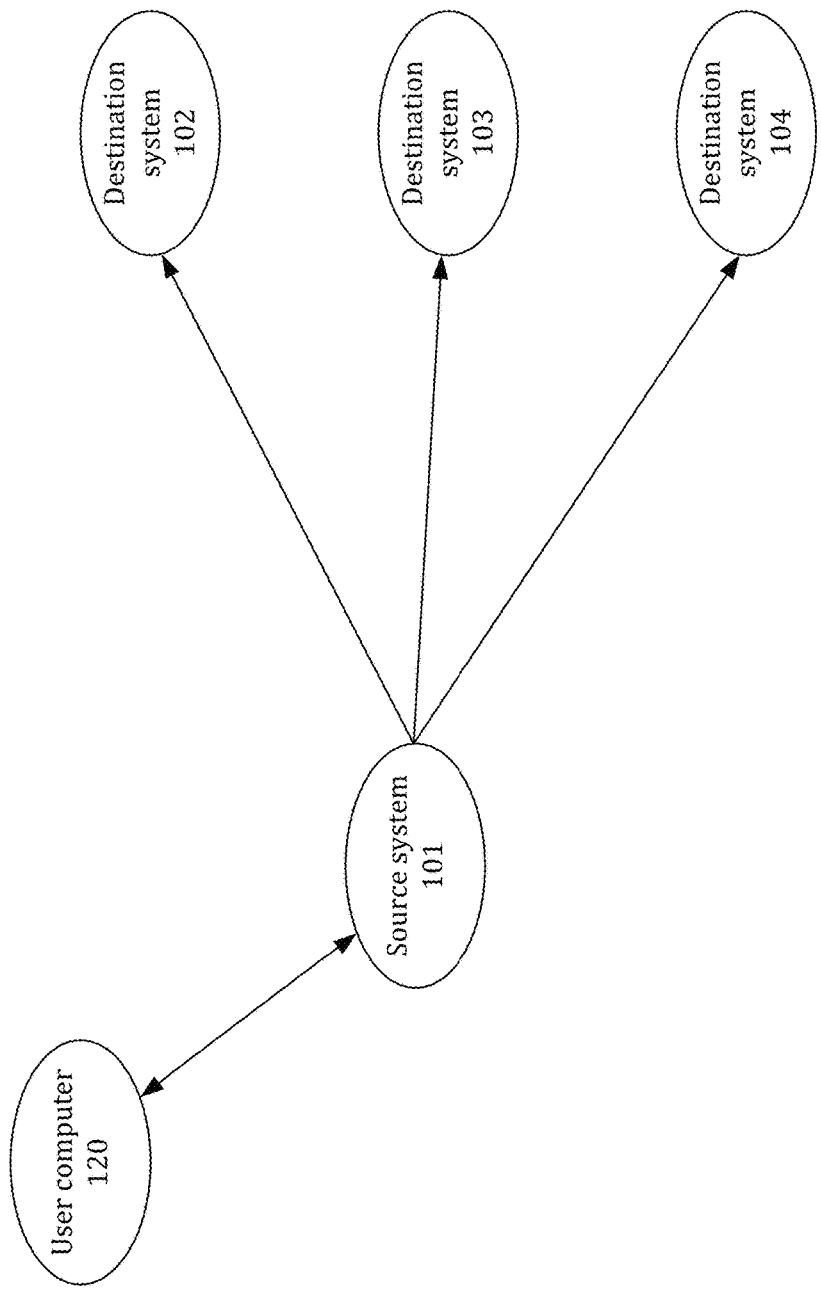
FIG. 1 is an example of storage systems participating in a star replication.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided storage systems, methods, and non-transitory computer readable media for recovery point objective compliant star replication.

A star replication includes a source storage system (SSS), such as storage system 101 of FIG. 1, and multiple destinations storage systems (DSSs), such as storage systems 102, 103 and 104 that serve as redundant systems. The SSS receives IO (input output) requests from a user computer 120, stores the data of write requests and replicates the stored data to the DSSs according to a replication schedule.

Each of the DSSs may be assigned by a user with a different replication schedule. A replication schedule refers to the time when each recurrent replication cycle is to be performed, such as the absolute time and/or frequency. For example, one DSS may be defined to start receiving replicated data from the SSS every minute, a second DSS may be defined to start receiving replicated data every two hours, a third DSS may be defined to start receiving replicated data every three hours, once a day on a certain hour, etc.

Each replication cycle may include taking a snapshot of the content to be replicated and stored in the SSS 101, and sending the differences between the content that was sent in the previous replication cycle and the current snapshotted content. The snapshot's global identifier is also sent to the DSS. The DSS will store the received content of the replication cycle, take a snapshot, and assign the global identifier to the snapshot.

When SSS 101 fails, a failover process is performed, where one of the DSSs, e.g., system 102, becomes the SSS of the star replication. A similar process of a role change (or graceful failover) occurs when a system administrator instructs to switch roles between the current SSS and one of the DSSs that will become the new source.

System 102, as the new SSS, will have to negotiate with each of the other DSSs to obtain the latest snapshot that is common to both sides (exists in both sides). The DSS is instructed by the new SSS to revert its current version to the common snapshot, and the replication is then initiated, by system 102, from the data that was written after the creation of the common snapshot, either new data written by users to system 102, after it becomes the source, or data of snapshots that are later than the common snapshot, and were replicated by system 101 to system 102, prior to the failover, and were not replicated to e.g., system 103 and/or 104, which are now the DSSs of system 102.

The different replication schedules of each of the DSSs may not synchronize with each other or may synchronized rarely. Assuming that the SSS is still system 101—and assuming that system 102 is scheduled to receive replication data every two hours (00:00, 2:00, 4:00, 6:00, 8:00, etc.), system 103 is scheduled to receive replication data every three hours (0:00, 3:00, 6:00, 8:00, etc.) and system 104 is scheduled to receive replication data every four hours (0:00, 4:00, 8:00, etc.). It means that the three systems will have a common snapshot only every 8 hours. Even if looking at each pair of systems—systems 102 and 103 are expected to have a common snapshot every 6 hours, systems 102 and 104 are expected to have a common snapshot every 4 hours, and systems 103 and 104 are expected to have a common snapshot every 8 hours. This matters when one of the destination systems is selected by the user to become the source system and there is a need to find a most recent common snapshot with each of the other destinations.

The user may define a RPO (recovery point objective) for the star replication, which is the maximum allowed gap, between the time when the most recent data was written to the source and the time of the data that the failed over replication starts to replicate from.

When system 102 becomes the SSS in response to a failover, the gap between the time of the snapshot that is common to both system 102 and system 103 may be 6 hours, where the requested RPO may be lower than this gap, for example, a 2 hours RPO.

In order to comply to the RPO, the SSS, prior to a failover (e.g., system 101), guarantees a replication of a common snapshot every time period that is derived from the RPO. The SSS monitors the replicated snapshots to the various DSSs, and if it detects that a certain snapshot is to be replicated to all the DSSs, it marks the snapshot as a common snapshot, and sends an indication to all the DSSs about this snapshot being a common snapshot, that should not be deleted, at least until the next identified common snapshot.

If the SSS identifies that a common snapshot was not replicated for a period that is longer than the RPO (or close to the RPO), then—it forces a non-scheduled snapshot (and non-schedule replication cycle), that is not part of the user defined replication schedule, and replicates the nonscheduled snapshot, as a common snapshot to all the DSSs.

Securing an existence of a common snapshot every time period that is lower than the RPO, facilitates a bounded gap between any storage system that becomes the SSS and any other DSS, where the bounded gap is smaller than the RPO.

Given the above schedule example and assuming that system 101 is the SSS then system 102 receives replication data every two hours: 00:00, 2:00, 4:00, 6:00, 8:00, etc., system 103 receives replication data every three hours: 0:00, 3:00, 6:00, 8:00, etc., and system 104 receives replication data every four hours: 0:00, 4:00, 8:00, etc. Given an RPO of two hours—the snapshot that is scheduled to 2:00 h, and would otherwise be replicated only to system 102, will be also replicated in an unsolicited manner to system 103 and 104, even though—it was not defined by the user. The snapshot of 4:00 h that would otherwise be replicated only to DSSs 102 and 104, will be also replicated in an unsolicited manner to DSS 103. The snapshot of 6:00 h will be sent in an unsolicited manner to DSS 104. The snapshot of 8:00 h is common to all the DSSs, according to the schedule defined by the user. Upon detecting that the 8:00 h snapshot is being replicated to all the DSS s, the snapshot is marked as a common snapshot, and there is no need for unsolicited snapshot replication.

The schedule scheme of the above example allows unsolicited sending of a snapshot, that was created for one DSS, to another DSS that is not scheduled to receive replication data at that point in time. There may be other schedules that do not allow taking advantage of an already created snapshot for sending it to a DSS that is not scheduled for replication. In such cases, an unsolicited snapshot is generated and sent to all the DSSs, regardless of the schedule defined by the user.

Figure 2:
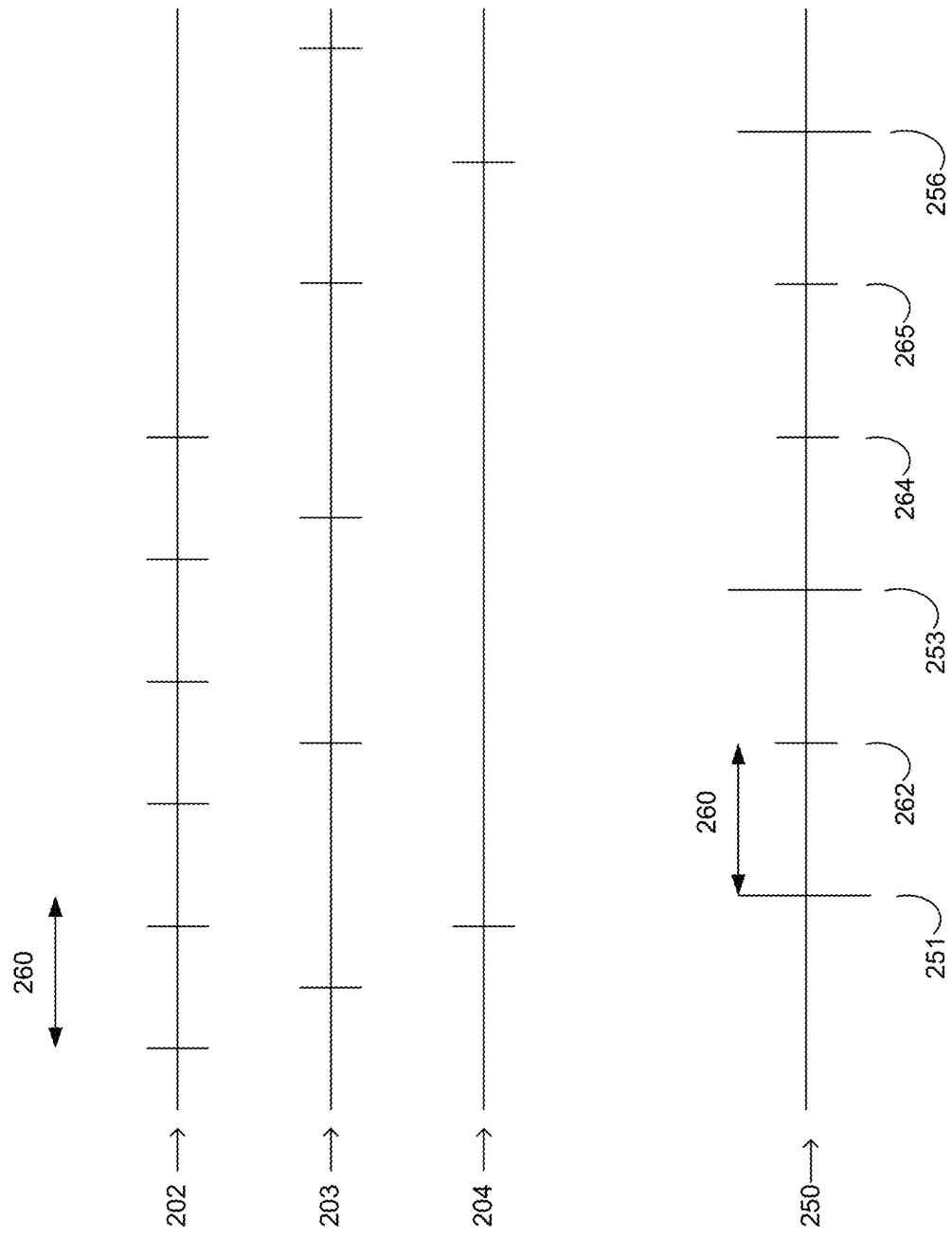
FIG. 2 is an example of a time diagram.

FIG. 2 illustrates timelines 202, 203 and 204 that correspond to the defined schedules of DSSs 102, 103 and 104, where the vertical bars represent the points in time where a snapshot is replicated to the destination, according to the schedule defined by the user. 260 is the defined RPO. Timeline 250 illustrates the points in time 251-256 and 262-265 when a common snapshot needs to be sent to all the DSSs. At points 251, 253 and 256, unsolicited snapshot is created and replicated to all the DSSs. Note that none of the systems is scheduled for replication cycles upon these time points. At points 262 and 265 the snapshot that is created as part of the schedule of DSS 103 is sent in an unsolicited manner also to DSSs 102 and 104. At point 264 the snapshot that is created as part of the schedule of DSS 102 is sent in an unsolicited manner also to DSSs 103 and 104. At other points, not shown, if there is a snapshot that is created as part of the schedules of all the DSSs—it is marked as a common snapshot.

When a failover occurs, and one of the DSSs, e.g., 102, becomes the SSS, it communicates with each of the other DSSs for obtaining the most recent snapshot that exists at both sides. This may be done by sending to the DSS a list of a certain number the most recent snapshot (identified by global snapshot identifiers) that are stored at the SSS, and receiving, from the DSS, the most recent snapshot that exists at the destination and is included in the list. Alternatively, the SSS may request from the DSS, a list of the most recent snapshots (identified by global snapshot identifiers) that are stored at the DSS. Alternatively, the SSS may send to the DSS the identifier of the most recent common snapshot that exists at the SSS and request from the DSS, a list of snapshots that are newer than the most recent common snapshot. The SSS checks whether there are newer snapshots that exist at the source, and selects the newest among them.

When the most recent snapshot that exists at both sides is determined, the SSS instructs the DSS to revert to this snapshot, and the replication proceeds from that point.

Figure 3:
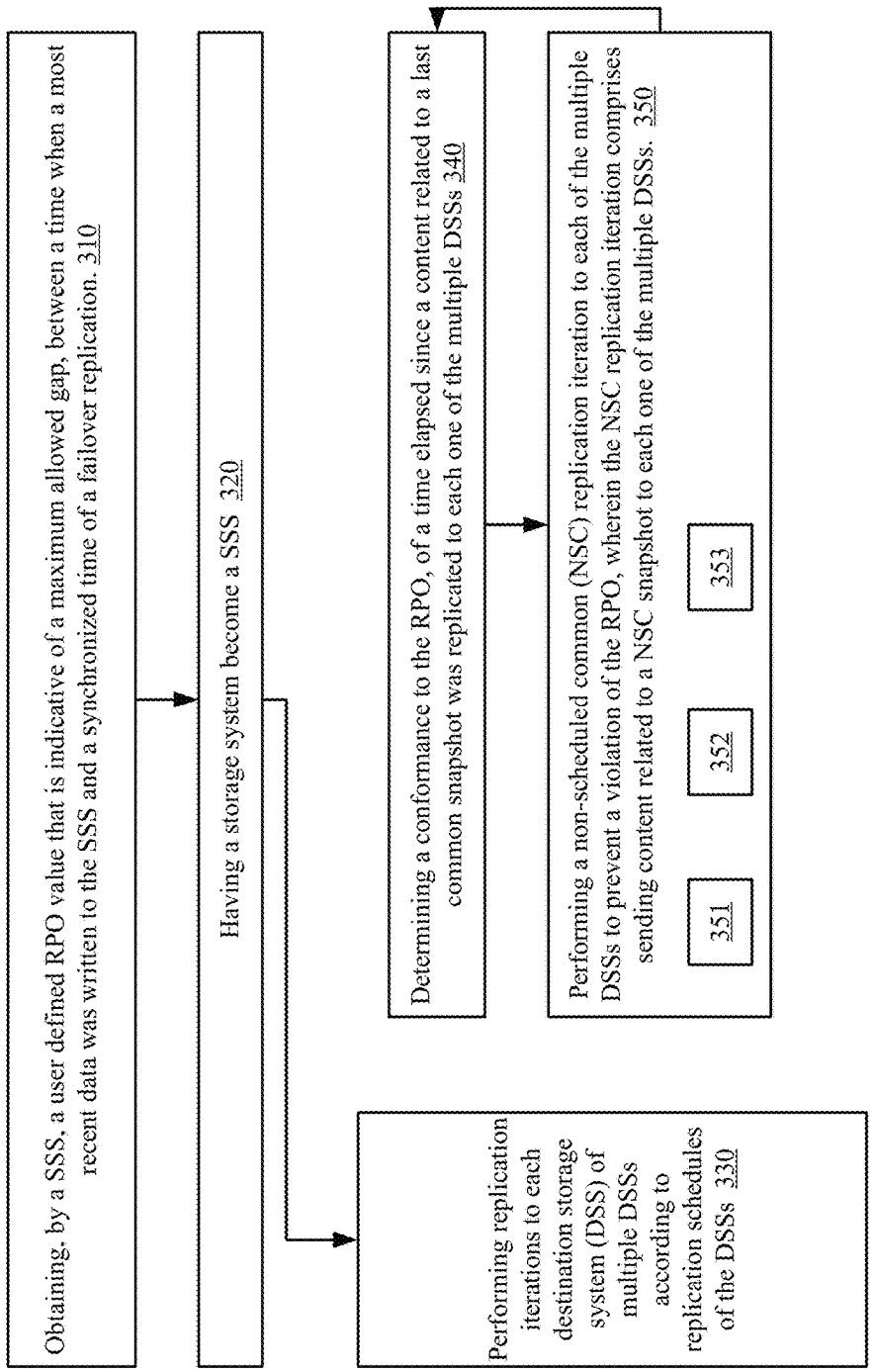
FIG. 3 is an example of a method.

FIG. 3 illustrates an example of method 300.

Method 300 may start by step 310 of obtaining, by a source storage system (SSS), a user defined recovery point objective (RPO) value that is indicative of a maximum allowed gap, between the time when the most recent data was written to the SSS and a synchronized time of a failover replication. The synchronized time is the time of the written data (or snapshot) that exists on both SSS and DSS, and from which a resumed replication can start after a failover.

Step 310 may be followed by step 320 of having a storage system become a SSS.

Assuming that the storage system became a SSS (be defined as a SSS by the storage system itself and/or by another entity) after a failure of another storage system that acted as a SSS, then step 320 may include (or may be followed by) searching, for each other DSS, for a latest snapshot that may be common between the SSS and the other DSS.

Step 320 may include requesting the other DSS to send a list of snapshots received by the other DSS, starting from a content related to a last received common snapshot that was received by the other DSS.

Step 320 may include determining the latest snapshot without asking the list of snapshots.

Step 320 may be followed by step 330 of performing replication iterations (replication cycles) to each destination storage system (DSS) of multiple DSSs according to replication schedules of the DSSs. At least two DSSs of the multiple DSSs may be assigned with replication schedules having different frequencies of replication iterations. Each replication iteration may include sending a content related to a scheduled snapshot.

Method 300 may also include step 340 of determining a conformance to the RPO, of the an elapsed time since a content related to a last common snapshot was replicated to each one of the multiple DSSs.

Step 340 may be followed by step 350 of performing a non-scheduled common (NSC) replication iteration to each of the multiple DSSs to prevent a violation of the RPO, wherein the NSC replication iteration may include sending content related to a NSC snapshot to each one of the multiple DSSs. The term NSC snapshot refers to content related to a single snapshot that is sent to all the DSSs.

Step 350 may include at least one of the following:
a. Step 351 of marking the NSC snapshot as common.
b. Step 352 of providing a non-erase indication that indicates that the content related to the NSC snapshot may be non-erasable at least until a replication of content related to a next common snapshot.
c. Step 353 of converting a scheduled replication iteration that may be user defined and may be initially aimed to less than all the multiple DSSs, to an NSC replication iteration.

Figure 4:
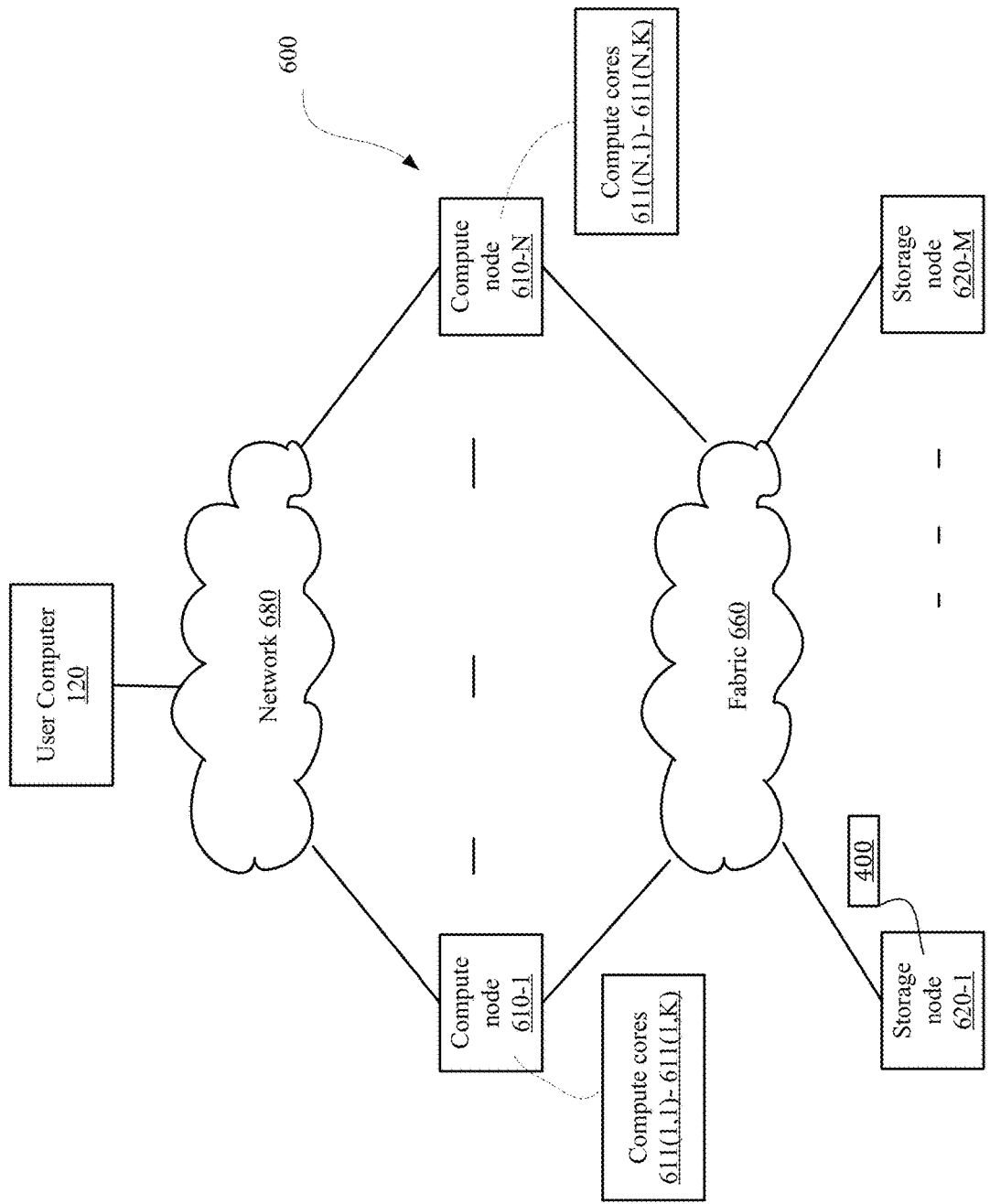
FIG. 4 is an example of a storage system and its environment.

FIG. 4 illustrates an example of a storage system and its environment.

For simplicity of explanation other storage systems are not shown and may have a similar structure.

The storage system 600 includes a number of N compute nodes 610-1 through 610-N (hereinafter referred to individually as a compute node 610 and collectively as compute nodes 610, merely for simplicity purposes, N is an integer equal to or greater than 1). The compute nodes include (or may execute) multiple compute cores each (for example 611(1,1)-611(1,K) of compute node 610-1 and 611(N,1)-611(N,K) of compute node 610-N).

The storage system 600 also includes a number of M storage nodes 620-1 through 620-M (hereinafter referred to individually as a storage node 620 and collectively as storage nodes 620, merely for simplicity purposes, M is an integer equal to or greater than 1). The computer nodes 610 and the storage nodes 620 are connected through a communication fabric 660. M may equal N or may differ from N. One or more of the compute nodes and/or one or more compute cores of at least one compute core may control the execution of the RPO compliant replication, as either the SSS or the DSS.

In an embodiment, a compute node 610 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 610 does not require any dedicated hardware.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for recovery point objective compliant star replication, the method comprises:
    obtaining, by a source storage system (SSS), a user defined recovery point objective (RPO) that is indicative of a maximum allowed gap, between a time when a most recent data was written to the SSS and a synchronized time of a failover replication; and
    performing replication iterations to each destination storage system (DSS) of multiple DSSs according to replication schedules of the DSSs, wherein at least two DSSs of the multiple DSSs are assigned with replication schedules having different frequencies of replication iterations; wherein each replication iteration comprises sending a content related to a scheduled snapshot;
    determining a conformance to the RPO, of a time elapsed since a content related to a last common snapshot was replicated to each one of the multiple DSSs;
    performing a non-scheduled common (NSC) replication iteration to each of the multiple DSSs to prevent a violation of the RPO, wherein the NSC replication iteration comprises sending content related to a NSC snapshot to each one of the multiple DSSs.

2. The method according to claim 1 comprising marking the NSC snapshot as common.

3. The method according to claim 1 comprising providing a non-erase indication that indicates that the content related to the NSC snapshot is non-erasable till a replication of content related to a next common snapshot.

4. The method according to claim 1 wherein the performing of the NSC replication iterations comprises converting a scheduled replication iteration that is user defined and is initially aimed to less than all the multiple DSSs, to an NSC replication iteration.

5. The method according to claim 1 comprising defining a storage system as the SSS following a failure of a previous SSS.

6. The method according to claim 5 wherein the defining is followed by searching, for each other DSS, for a latest snapshot that is common between the SSS and the other DSS.

7. The method according to claim 6, wherein the searching comprises requesting the other DSS to send a list of snapshots received by the other DSS, starting from a content related to a last received common snapshot that was received by the other DSS.

8. A non-transitory computer readable medium for recovery point objective compliant star replication, the non-transitory computer readable medium stores instructions that once executed by a source storage unit (SSS) cause the SSS to:
    obtain a user defined recovery point objective (RPO) that is indicative of a maximum allowed gap, between a time when a most recent data was written to the SSS and a synchronized time of a failover replication; and
    perform replication iterations to each destination storage system (DSS) of multiple DSSs according to replication schedules of the DSSs, wherein at least two DSSs of the multiple DSSs are assigned with replication schedules having different frequencies of replication iterations; wherein each replication iteration comprises sending a content related to a scheduled snapshot;
    determine a conformance to the RPO, of a time elapsed since a content related to a last common snapshot was replicated to each one of the multiple DSSs; and
    perform a non-scheduled common (NSC) replication iteration to each of the multiple DSSs to prevent a violation of the RPO, wherein the NSC replication iteration comprises sending content related to a NSC snapshot to each one of the multiple DSSs.

9. The non-transitory computer readable medium according to claim 8, that stores instructions that once executed by the SSS cause the SSS to mark the NSC snapshot as common.

10. The non-transitory computer readable medium according to claim 8, that stores instructions that once executed by the SSS cause the SSS to provide a non-erase indication that indicates that the content related to the NSC snapshot is non-erasable till a replication of content related to a next common snapshot.

11. The non-transitory computer readable medium according to claim 8, wherein a performing of the NSC replication iterations comprises converting a scheduled replication iteration that is user defined and is initially aimed to less than all the multiple DSSs, to an NSC replication iteration.

12. The non-transitory computer readable medium according to claim 8, that stores instructions that once executed by the SSS cause the SSS to be defined as the SSS following a failure of a previous SSS.

13. The non-transitory computer readable medium according to claim 12, that stores instructions that once executed by the SSS cause the SSS to search, for each other DSS, for a latest snapshot that is common between the SSS and the other DSS.

14. The non-transitory computer readable medium according to claim 13, that stores instructions that once executed by the SSS cause the SSS to search by requesting the other DSS to send a list of snapshots received by the other DSS, starting from a content related to a last received common snapshot that was received by the other DSS.

15. A source storage system (SSS) comprising storage units and a processing circuit,
wherein the processing circuit is configured to:
obtain a user defined recovery point objective (RPO) that is indicative of a maximum allowed gap, between a time when a most recent data was written to the storage unit and a synchronized time of a failover replication; and
perform replication iterations to each destination storage system (DSS) of multiple DSSs according to replication schedules of the DSSs, wherein at least two DSSs of the multiple DSSs are assigned with replication schedules having different frequencies of replication iterations; wherein each replication iteration comprises sending a content related to a scheduled snapshot;
determine a conformance to the RPO, of a time elapsed since a content related to a last common snapshot was replicated to each one of the multiple DSSs;
perform a non-scheduled common (NSC) replication iteration to each of the multiple DSSs to prevent a violation of the RPO, wherein the NSC replication iteration comprises sending content related to a NSC snapshot to each one of the multiple DSSs.

16. The storage system according to claim 15, wherein the processing circuit is configured to mark the NSC snapshot as common.

17. The storage system according to claim 15, wherein the processing circuit is configured to provide a non-erase indication that indicates that the content related to the NSC snapshot is non-erasable till a replication of content related to a next common snapshot.

18. The storage system according to claim 15, wherein the processing circuit is configured to perform the NSC replication iterations by converting a scheduled replication iteration that is user defined and is initially aimed to less than all the multiple DSSs, to an NSC replication iteration.

19. The storage system according to claim 15, wherein the processing circuit is configured to cause the SSS to be defined as the SSS following a failure of a previous SSS.

20. The storage system according to claim 19, wherein the processing circuit is configured to search, for each other DSS, for a latest snapshot that is common between the SSS and the other DSS.

21. The storage system according to claim 20, wherein the processing circuit is configured to search by requesting the other DSS to send a list of snapshots received by the other DSS, starting from a content related to a last received common snapshot that was received by the other DSS.

* * * * *